(12) United States Patent
Beynon (10) Patent No.: US 8,858,133 B2
(45) Date of Patent: Oct. 14, 2014

(54) CUTTING APPARATUS

(75) Inventor: Andrew Mark Beynon, Cambridge (GB)

(73) Assignee: C4 Carbides Limited, Cambridge (GB)

( * ) Notice: Subject to any disclaimer, the term of this patent is extended or adjusted under 35 U.S.C. 154(b) by 969 days.

(21) Appl. No.: 12/747,567

(22) PCT Filed: Dec. 8, 2008

(86) PCT No.: PCT/GB2008/004036
§ 371 (c)(1),
(2), (4) Date: Jun. 11, 2010

(87) PCT Pub. No.: WO2009/074776
PCT Pub. Date: Jun. 18, 2009

(65) Prior Publication Data
US 2010/0278601 A1    Nov. 4, 2010

(30) Foreign Application Priority Data

Dec. 11, 2007 (GB) .................................. 0724141.7

(51) Int. Cl.
*B23B 35/00* (2006.01)
*B23B 51/04* (2006.01)
*B28D 1/04* (2006.01)

(52) U.S. Cl.
CPC ............ *B28D 1/041* (2013.01); *B23B 51/0426* (2013.01)
USPC ......................................... 408/204; 408/1 R (58) Field of Classification Search
CPC B23B 41/06; B23B 39/04; B23B 2200/3618; B23B 51/0406
USPC ......... 408/68, 86, 112, 204, 67, 79, 206–207; 175/404, 385; 144/136.95
See application file for complete search history.

(56) References Cited

U.S. PATENT DOCUMENTS

| | | | | | |
|---|---|---|---|---|---|
| 58,924 | A | * | 10/1866 | Webster | 408/86 |
| 475,559 | A | * | 5/1892 | Heydenreich | 408/119 |
| 2,484,150 | A | * | 10/1949 | Brown | 408/204 |
| 3,162,067 | A | * | 12/1964 | Koons et al. | 408/206 |
| 3,265,104 | A | * | 8/1966 | Gallo, Sr. | 408/68 |
| 3,609,056 | A | * | 9/1971 | Hougen | 408/204 |
| 3,833,073 | A | * | 9/1974 | Carver | 175/173 |
| 4,090,804 | A | * | 5/1978 | Haley | 408/59 |
| 4,193,721 | A | * | 3/1980 | Hougen | 408/68 |
| 4,204,783 | A | * | 5/1980 | Hougen | 408/68 |
| 4,385,853 | A | * | 5/1983 | Strange et al. | 408/68 |

(Continued)

FOREIGN PATENT DOCUMENTS

| | | |
|---|---|---|
| DE | 84 23 757 | 11/1984 |
| EP | 1 348 528 | 10/2003 |
| JP | 63-186512 | 11/1988 |

OTHER PUBLICATIONS

Office Action dated Mar. 15, 2013 issued in Japanese Patent Application No. 2010-537503 and English translation, 5 pp.

*Primary Examiner* — Alexander P Taousakis
(74) *Attorney, Agent, or Firm* — Nixon & Vanderhye P.C.

(57) ABSTRACT

Cutting apparatus includes a pilot arrangement which has a tip. The tip engages a workpiece to form a pilot recess to engage the workpiece and prevent the apparatus skidding across the surface of the workpiece. The tip can retract against the action of a spring. Accordingly, the apparatus is prevented from skidding across the workpiece, but wear on the tip is minimized.

17 Claims, 5 Drawing Sheets

(56) References Cited

U.S. PATENT DOCUMENTS

| | | | |
|---|---|---|---|
| 4,406,334 A * | 9/1983 | Baumann et al. | 175/315 |
| 4,408,935 A * | 10/1983 | Miyanaga | 408/206 |
| 4,490,080 A * | 12/1984 | Kezran | 408/112 |
| 4,624,608 A * | 11/1986 | Shiomi et al. | 408/56 |
| 4,749,315 A * | 6/1988 | Mills | 408/209 |
| 5,062,748 A * | 11/1991 | Kishida | 408/206 |
| 5,171,111 A * | 12/1992 | Kishimoto | 408/67 |
| 5,316,418 A * | 5/1994 | Miyanaga | 408/201 |
| 5,653,560 A * | 8/1997 | Weber et al. | 408/1 R |
| 5,732,784 A * | 3/1998 | Nelson | 175/385 |
| 5,743,682 A * | 4/1998 | Chaney, Sr. | 408/79 |
| 6,250,856 B1 * | 6/2001 | Miyanaga | 408/57 |
| 6,375,396 B1 * | 4/2002 | Fangmann et al. | 408/206 |
| 6,517,296 B2 * | 2/2003 | Newmark | 408/82 |
| 6,880,648 B2 * | 4/2005 | Edscer | 175/61 |
| 7,419,016 B2 * | 9/2008 | Hall et al. | 175/399 |
| 7,556,459 B2 * | 7/2009 | Rompel | 408/204 |
| 7,578,324 B2 * | 8/2009 | Cantlon | 144/136.95 |
| 7,648,315 B2 * | 1/2010 | Omi et al. | 408/57 |
| 7,896,590 B2 * | 3/2011 | Miller et al. | 408/226 |
| 7,967,535 B2 * | 6/2011 | Eiserer et al. | 408/204 |
| 2003/0213621 A1 * | 11/2003 | Britten et al. | 175/404 |

* cited by examiner

CUTTING APPARATUS

This application is the U.S. national phase of International Application No. PCT/GB2008/004036 filed 8 Dec. 2008 which designated the U.S. and claims priority to Great Britain Patent Application No. 0724141.7 filed 11 Dec. 2007, the entire contents of each of which are hereby incorporated by reference.

The present invention relates to cutting apparatus, particularly rotary cutting apparatus.

Rotary cutting apparatus exists in many forms. In one example, called a "holesaw", an annular cut is made by a blade formed around the mouth of a cup-like member which is rotated against the workpiece. Teeth are typically formed around the mouth. In some circumstances, such as when starting a cut into very hard material, such as ceramic tiles, it is difficult to prevent a holesaw biting into the tile material and skidding or skating across the surface of the tile, possibly causing damage.

Examples of the present invention provide cutting apparatus comprising:
  a cutting arrangement rotatable about a rotation axis to engage a workpiece and form an annular cut therein;
  a pilot arrangement rotatable about the said axis to engage a workpiece and form a pilot recess which is smaller in radius than the annular cut;
  the pilot arrangement serving to locate within the pilot recess to prevent the pilot arrangement skidding across the workpiece;
  a drive arrangement for the cutting arrangement and for the pilot arrangement; and
  an arrangement operable for retraction of the pilot arrangement relative to the cutting arrangement, as the cutting arrangement is advanced.

The pilot arrangement may project beyond the cutting arrangement, to engage a workpiece before the workpiece is engaged by the cutting arrangement.

In a further aspect, examples of the invention provide a pilot arrangement rotatable about an axis to form a pilot cut in a workpiece, and to engage the pilot cut to maintain the position of the rotation axis relative to the workpiece, and the arrangement having a mounting portion, a cutting portion and an arrangement operable for retraction of the cutting portion relative to the mounting portion.

The pilot arrangement may be retracted by force applied to the pilot arrangement. The force may be generated by pushing the pilot arrangement against a workpiece. The pilot arrangement may be mounted by means of first and second components movable relative to each other, and a bias arrangement acting to bias the relative positions of the components. The components may be biased to relative positions at which the pilot arrangement is advanced. The components may form a telescopic arrangement. The components may be relatively movable along the axis. One of the components may be an elongate member, the other being a sleeve in which the elongate member is axially movable. The elongate member may be captive in the sleeve.

The pilot arrangement may cut the pilot recess. The pilot arrangement may comprise a cutting tip which engages the workpiece to form the pilot recess. The tip may be carried by a member which engages the workpiece, as the pilot recess is formed, to limit the depth of the pilot recess. The tip may comprise a tip body having a tip extremity providing first contact with a workpiece, and having a cutting formation which cuts the workpiece as the extremity penetrates the workpiece, wherein the extremity is offset from the rotation axis. The body may have a tapering portion which tapers to the tip extremity. The tapering portion may have the form of a cone centred at the rotation axis and modified to be bounded at a surface which is not perpendicular to the rotation axis and which intersects the rotation axis within the unmodified cone. An edge at the intersection of the bounding surface and the surface of the unmodified cone may provide the or a cutting formation. The bounding surface may be a plane. The tip may be carried by a cylindrical portion centred at the rotation axis.

The cutting arrangement may comprise a generally circular cutting edge.

In another aspect, examples of the invention provide a method of cutting in which cutting apparatus as defined above is offered to a workpiece to form a pilot recess by means of the pilot arrangement, and an annular cut by means of the cutting arrangement, and the pilot arrangement is retracted relative to the cutting arrangement as the cutting arrangement is advanced, the pilot arrangement serving to form a pilot recess and to engage the pilot recess to prevent the pilot arrangement skidding across the workpiece.

Examples of the present invention will now be described in more detail, by way of example only, and with reference to the accompanying drawings, in which.

The drawings illustrate cutting apparatus 10 which includes a cutting arrangement 12. The cutting arrangement 12 is in the form of a holesaw, being an open cylindrical cup centred at a rotation axis 14 and carrying a ring of teeth 16 around the mouth of the cup. The cutting arrangement 12 is rotatable about the rotation axis 14 to engage a workpiece 18 to form an annular cut 19 in the workpiece 18.

A pilot arrangement 20 is generally elongate and centred at the axis 14 to be rotatable about the axis 14. This allows the pilot arrangement 20 to form a pilot recess 22 which is smaller in radius than the annular cut 19. The pilot arrangement 20 serves to locate within the pilot recess 22 to prevent the pilot arrangement skidding across the workpiece 18, in a manner which will be described more fully below.

A drive arrangement 24, illustrated in the form of an arbor or chuck, provides drive for the cutting arrangement 12 and for the pilot arrangement 20.

A retraction arrangement 26 (shown particularly in FIG. 4) allows for retraction of the pilot arrangement 20 relative to the cutting arrangement 12 and the drive arrangement 24.

In more detail, the apparatus 10 is mounted in the arbor 24, which may be the arbor of a power tool indicated in broken lines 28. In use, the tool 28 drives the arbor 24 to rotate about the rotation axis 14 and hence the apparatus 10 also rotates.

The teeth 16 around the mouth of the cup 12 are formed from tipping material such as tungsten carbide, and are separated from neighbouring teeth by gullets 30.

Figure 2:
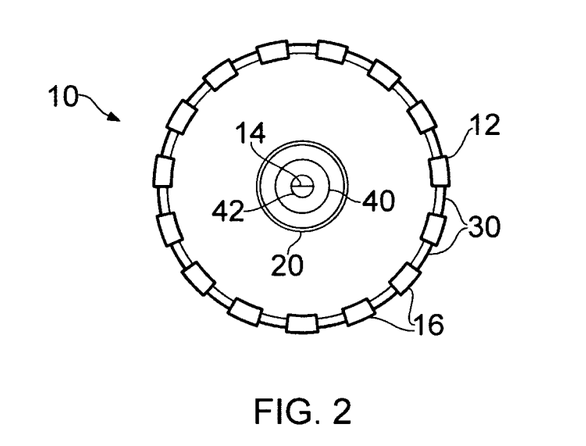
FIG. 2 is a front view of the apparatus of FIG. 1.
Figure 3:
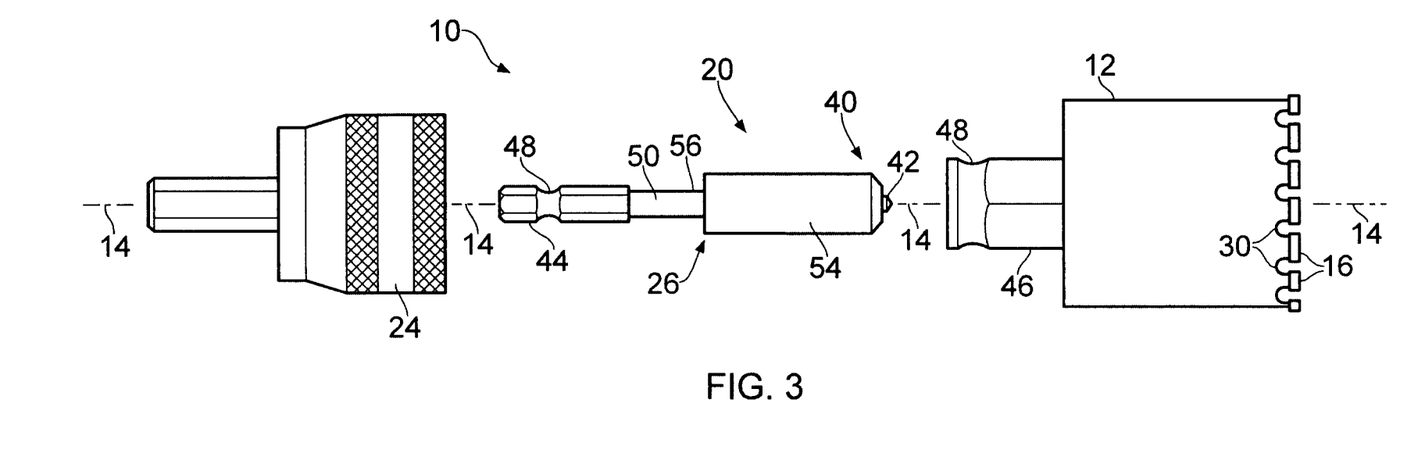
FIG. 3 is a disassembled side elevation of the apparatus of FIG. 1.

In this example, the pilot arrangement 20 has a forwardmost tip 40 in the form of a small conical element 42, which may also be tungsten carbide. The conical element 42 is positioned at the rotation axis 14. The radial extent of the conical element 42 (from the axis 14) is much smaller than the radius of the teeth 16 from the axis 14, as can readily be seen from FIG. 2.

Figure 1:
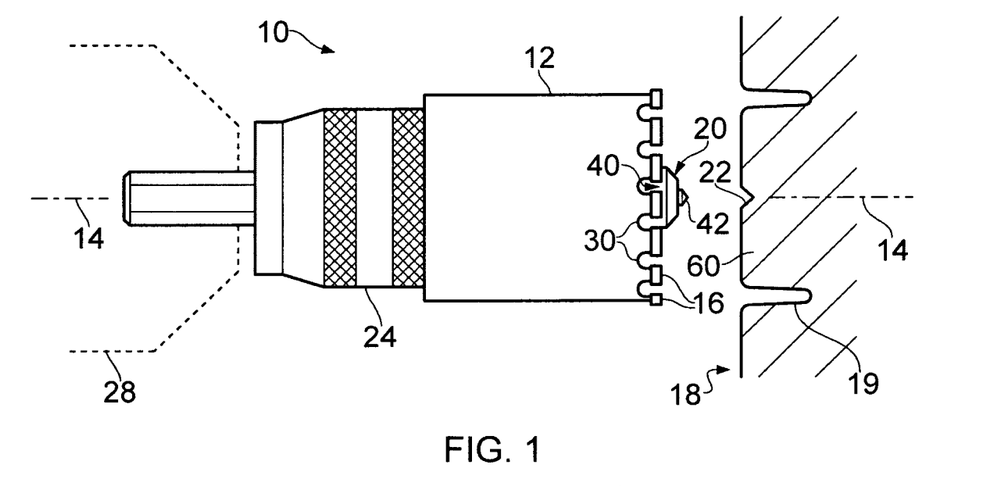
FIG. 1 is a side elevation of an example of cutting apparatus in accordance with the present invention.

In the relaxed position illustrated in FIG. 1, the pilot arrangement 20 extends out through the mouth of the cup 12, to position the conical element 42 beyond the teeth 16. That is, when viewed along the axis 14 from the chuck 24, the conical element 42 lies beyond the transverse plane defined by the teeth 16.

In the examples illustrated in the drawings, the cutting arrangement 12 and the pilot arrangement 20 form discrete components of the apparatus 10, each mounted independently in the arbor 24. For this example, the arbor 24 may be of the type manufactured by Robert Bosch GmbH and known as the "Power Change Arbor Assembly". Other arbor or chuck designs could be used.

For the Bosch Power Change arbor 24, the pilot arrangement 20 has a hexagonal cylindrical section 44. This forms a mounting portion for the pilot arrangement: The cutting arrangement 12 has a similar hexagonal section 46. Each of the hexagonal sections 44, 46 has a circumferential groove 48 which interacts with a respective ball bearing arrangement within the arbor 24, to mount the corresponding component in the arbor 24. The hexagonal section 46 of the cutting arrangement 12 has a central hexagonal bore for receiving the section 44 so that engagement between the hexagonal male and female sections ensures that the cutting arrangement 12 and pilot arrangement 20 will both rotate together around the axis 14, when driven by the arbor 24.

Figure 4:
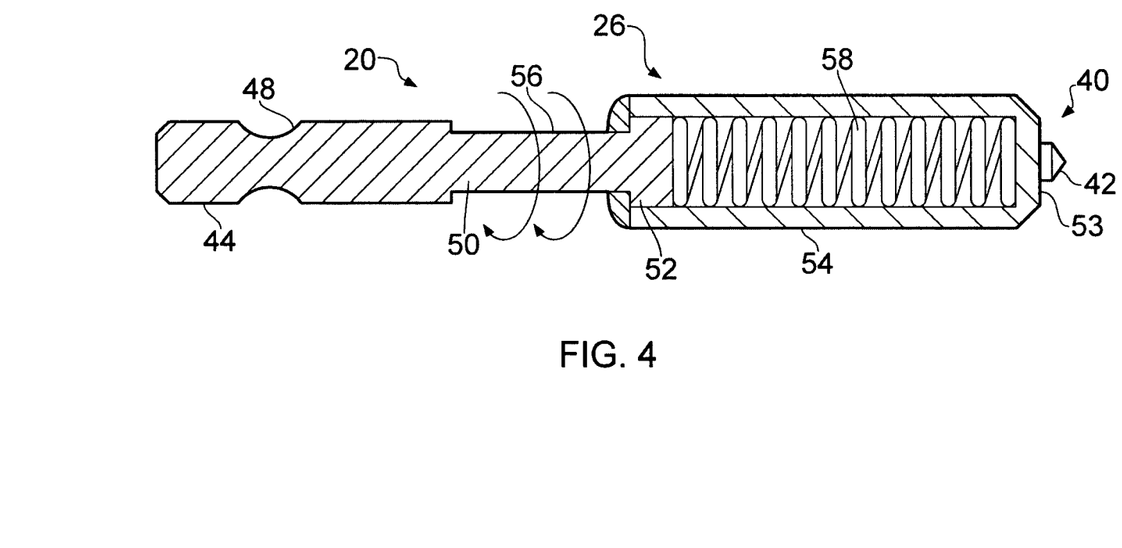
FIG. 4 is an enlarged section through the pilot arrangement of the apparatus of FIG. 1.
Figure 5:
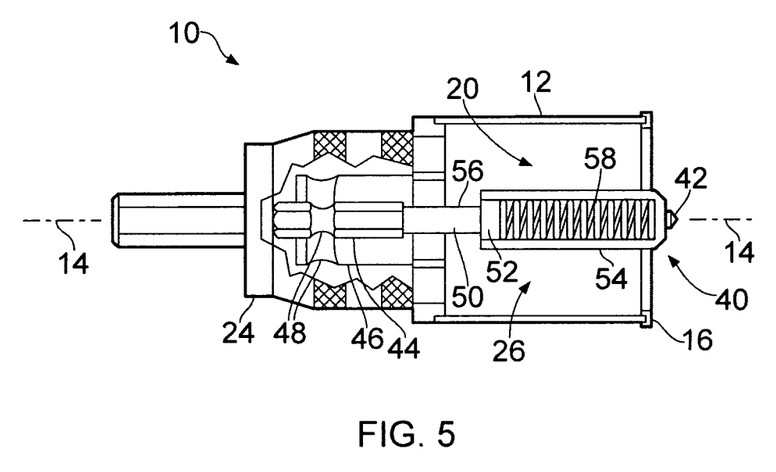
FIG. 5 is a diagrammatic and partially cut away side view of the apparatus of FIG. 1.

An example pilot arrangement 20 is illustrated in more detail in FIG. 4. A pilot shaft 50, having the hexagonal section 44 at one end, has a head 52 at the other end, located within a sleeve 54. The sleeve 54 carries the tip 40, at one end, projecting from the end face 53 of the sleeve 54. The end face 53 is generally transverse to the axis 14.

The head 52 is captive within the sleeve 54. This may be achieved in a number of ways. For example, material of the sleeve 54 may be crimped, folded, rolled or otherwise deformed to enter a circumferential slot 56 behind the head 52, thereby trapping the head 52. In other examples, a circlip or oversize head (not shown) could be used. A compression spring 58 extends axially along the sleeve 54, from the face of the head 52, to the other end of the sleeve 54. The spring 58 serves to bias the sleeve 54 and pilot shaft 50 to the position illustrated in FIG. 4, in which the head 52 is being pushed out of the sleeve 54, being retained therein by the arrangement just described. The telescopic arrangement of the components 50, 54 allows them to move relative to one another, along the axis 14. This allows the pilot arrangement 20, and in particular the tip 40, to retract relative to the cutting arrangement 12, and relative to the shaft 50.

The apparatus 10 can be used in a manner illustrated in FIG. 1, as follows.

Once the desired position has been chosen for a circular hole to be cut in the workpiece 18 by the cutting arrangement 12, the apparatus 10 is offered to the workpiece 18 with the plane of the teeth 16 generally parallel with the workpiece 18, and with the conical element 42 at the centre of the desired circular hole. As the apparatus 10 approaches the workpiece 18, first contact will be between the conical element 42 and the workpiece 18, by virtue of the projection of the conical element 42 forward of the teeth 16. This results in a small conical pilot recess 22 being formed. As soon as the pilot recess 22 has been formed, mechanical engagement will exist between the conical element 42 and the pilot recess 24, serving to resist the conical element 42 from skidding across the surface of the workpiece 18 and thereby keeping the cutting arrangement 12 correctly positioned relative to the workpiece 18, at the desired position for the hole being formed.

Once this mechanical engagement has been achieved, the apparatus 10 can be pushed further toward the workpiece 18, in particular advancing the cutting arrangement 12 toward and into engagement with the workpiece 18. This movement is resisted by the spring 58, which must be compressed in order to allow the cutting arrangement 12 to move forward relative to the conical element 42. Thus, the element 42 retracts relative to the cutting arrangement 12, as the cutting arrangement advances. As this movement occurs, the teeth 16 begin to cut into the workpiece 18, forming the annular cut 19. Any tendency for the teeth 16 to skid across the surface of the workpiece 18 is resisted by the mechanical engagement between the conical element 42 and the pilot recess 22. Furthermore, as this movement occurs, the spring 58 becomes increasingly compressed by the sleeve 54 moving back over the head 52 (toward the arbor 24), thereby pressing the element 42 into the pilot recess 24, to help maintain the position of the cutting arrangement 12 relative to the workpiece 18.

The depth of the pilot recess 24 is eventually limited by abutment of the end face 55 with the workpiece 18.

It can therefore be seen that the action of the conical element 42 is reduced only to the action required for forming the pilot recess 22 sufficiently deep to provide the mechanical engagement. Further penetration into the workpiece 18 by the conical element 42 is prevented. Consequently, wear of the conical element 42 is minimised by avoiding unnecessary working of the workpiece 18, by the conical element 42. This is expected to increase the life of the conical element 42 by a significant amount.

Once the cutting arrangement 12 has completed the annular cut 19 through the workpiece 18, a circular hole will have been formed and a circular slug 60 will be in the mouth of the cup 12. The sleeve 54 will have been pushed back over the pilot shaft 50 and the spring 58 will be compressed. Accordingly, when the apparatus 10 is removed from the workpiece 18, the spring 58 will tend to relax, pushing the sleeve 54 back to the original position illustrated in FIG. 4 and thereby ejecting the slug 60 from the cutting arrangement 12.

Figure 6:
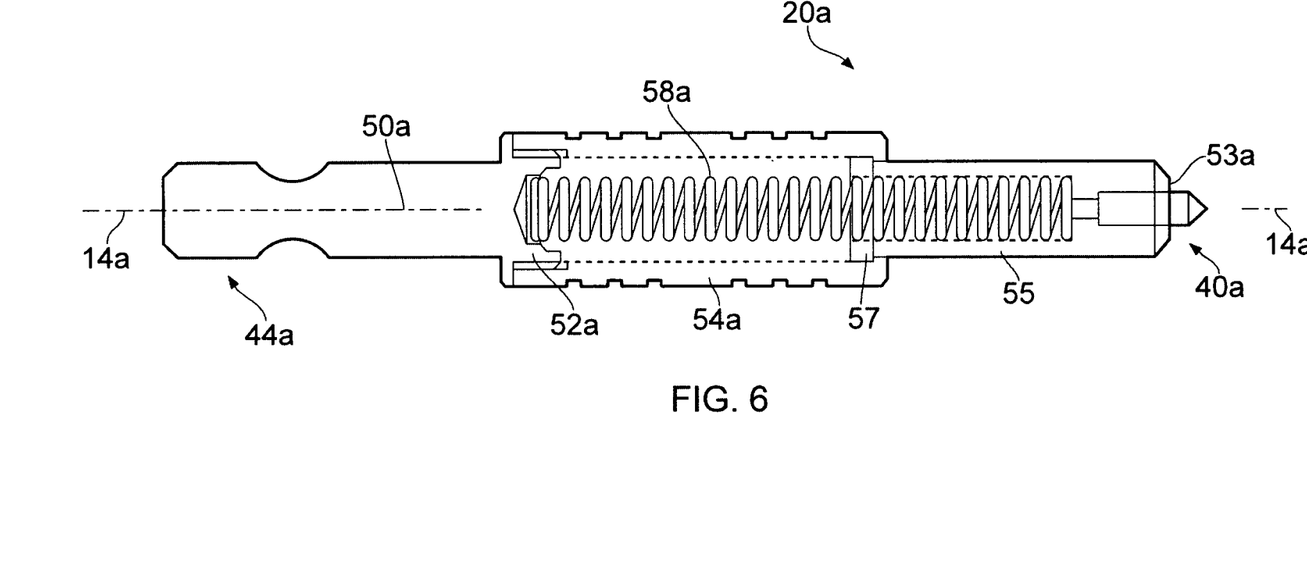
FIG. 6 corresponds with FIG. 4 and shows an alternative.

An alternative example pilot arrangement 20a is illustrated in FIG. 6. Features corresponding with those of the arrangement of FIG. 4 are given the same reference numerals, with the suffix "a".

A pilot shaft 50a, having the hexagonal section 44a at one end, has a head 52a at the other end, located within a sleeve 54a. The head 52a is threaded, brazed, adhered or otherwise secured to the sleeve 54a. At the other end of the sleeve 54a, a hollow finger 55 has a head 57 located within the sleeve 54a. The finger 55 carries the tip 40a at its free end. The tip 40a projects from the end face 53a of the finger 55. The end face 53a is generally transverse to the axis 14a.

The head 57 is captive within the sleeve 54a. This may be achieved in a number of ways. For example, the head 57 may be oversize, with material of the sleeve 54a being crimped, folded, rolled or otherwise deformed to reach behind the head 52a, thereby trapping the head 52a. In other examples, a circlip or circumferential slot (not shown) could be used. A compression spring 58a extends axially along the sleeve 54a, from the face of the head 52a, to the other end of the sleeve 54a, and into the hollow finger 55. The spring 58a serves to bias the finger 55 and sleeve 54a to the position illustrated in FIG. 6, in which the finger 55 is being pushed out of the sleeve 54a, being retained therein by the arrangement just described. The telescopic arrangement of the components 54a, 55 allows them to move relative to one another, along the axis 14a. This allows the pilot arrangement 20a, and in particular the tip 40a, to retract relative to the cutting arrangement 12, and relative to the shaft 50a.

The alternative arrangement 20a can be used in the same manner as described above in relation to FIG. 1.

The tip 40 has been described above as a small conical element. Other alternatives are possible. One alternative is illustrated in the remaining figures, on an enlarged scale.

Figure 7:
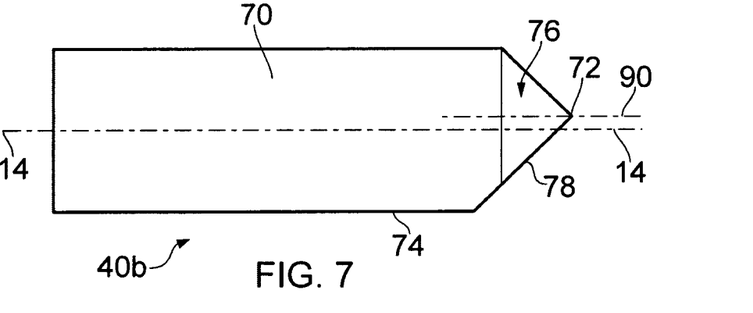
FIGS. 7, 8 and 9 are views, on an enlarged scale, of a tip body for use with the arrangements of FIGS. 4 and 6.
Figure 8:
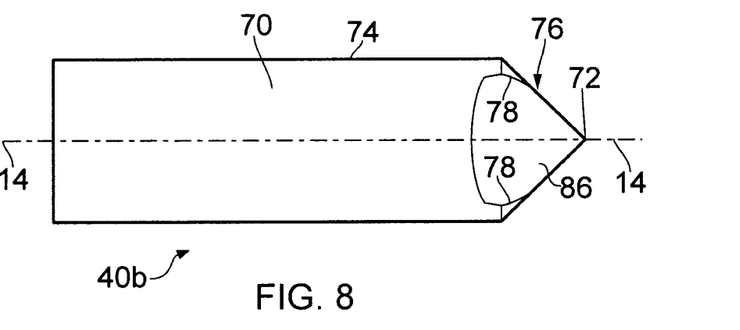
Figure 9:
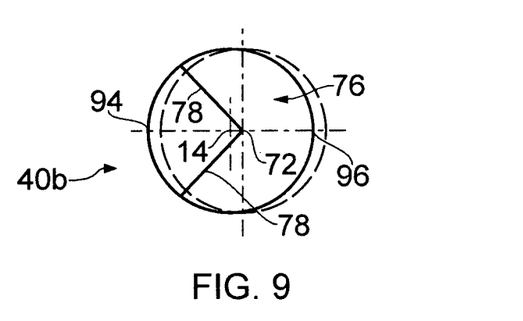

FIGS. 7, 8 and 9 illustrate a tip 40b. The tip 40b may comprise a tip body 70, which may be a solid block of tungsten carbide or other cutting material, and has a tip extremity 72 providing first contact with a workpiece (not shown), in the manner described above. The tip body 70 has a cylindrical portion 74 centred at the rotation axis 14. A tapering portion 76 tapers from the cylindrical portion 74 to the tip extremity 72. The tip body 70 has a cutting formation 78 which cuts a workpiece as the extremity penetrates the workpiece. The cutting formation 78 can best be described by considering an example method for forming the tip body 70, illustrated in FIG. 10.

Figure 10:
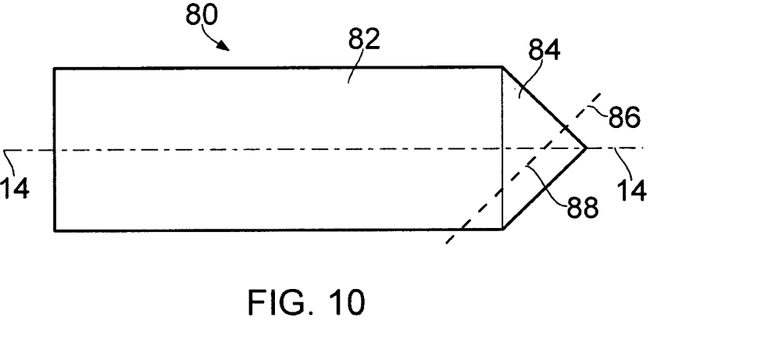
FIG. 10 is a blank for use in forming the tip body.

In the example of FIG. 10, a blank 80 has a cylindrical portion 82 centred at the rotation axis 14, and a tapering portion 84. The tapering portion 84 has the form of a cone centred at the rotation axis 14. The blank 80 is then modified by cutting or grinding along a broken line 86. The broken line 86 represents a plane which is not perpendicular to the rotation axis 14 and which intersects the rotation axis 14 at a point 88 which is within the unmodified cone. The effect of modifying the blank 80 to be bounded at the plane represented by the line 86 results in a number of features which can be seen from FIGS. 7 to 9.

First, having removed material from the summit of the unmodified tapering portion 84, the extremity 72 is offset from the rotation axis 14, as can be seen from the separation between the rotation axis 14, and a line 90 through the extremity 72 (FIG. 7). In one example, the offset may be about 0.2 mm. Secondly, edges 78 at the intersection of the bounding surface 86 and the surface of the unmodified cone 84 provide edges which act as cutting formations when engaging a workpiece.

FIG. 9 illustrates the significance of the geometry just described. FIG. 9 illustrates the tip 40b when viewed along the rotation axis 14. The extremity 72 is offset from the rotation axis 14, as noted above. The separation of the extremity 72 from a point 94 approximately midway between the edges 78, is further than the separation of the extremity 72 from a point 96, diametrically opposite the point 94. Furthermore, although the axis 14 is nominally the rotation axis, around which the chuck 24 is turning, the extremity 72 will define a new rotation axis, slightly offset from the axis 14, as the extremity 72 engages the workpiece. Consequently, as the tip 40b turns around the extremity 72, the pilot recess formed in the workpiece will have a diameter slightly larger than the diameter of the cylindrical portion 74, determined by the separation of the extremity 72 and the point 94. Contact between the tip 40b and the workpiece will therefore occur only in the vicinity of the point 94. This is expected to reduce wear of the tip 40b. Some wear is to be expected along the edges 78, as the workpiece is cut to form the pilot recess, but this is likely to result in a form of self-sharpening of the edges 78. Once the pilot recess has reached the depth limit, further wear of the tip 40b is expected to be minimal, as the tip 40b turns in a slightly oversize pilot recess.

Many variations and modifications can be made to the arrangements described above, without departing from the scope of the invention. In particular, many different materials, dimensions, relative dimensions, shapes and sizes can be envisaged. Diamond, tungsten carbide or other hard or abrasive materials could be used for the conical elements 42, 42a, 76 and for the teeth 16. Many forms of elements 42, 42a, 76 and teeth 16 could be envisaged. The elements 42, 42a, 76 could themselves form an annular cut, rather than a conical cut. Alternatively, the element could penetrate the workpiece in a form of pricking action, rather than by cutting. The pilot arrangement 20 could be supplied independently, for fitting with a conventional holesaw, instead of a conventional pilot twist drill. The arrangement for mounting the apparatus in a chuck or arbor could be modified from that illustrated, to a form suitable for a conventional or other form of proprietary chuck or arbor.

The ability for the pilot arrangement to retract allows the cutting arrangement 12 to be guided without the pilot arrangement being required to cut unnecessarily deeply into the workpiece. In particular, the pilot arrangement does not cut more deeply than the final depth of the cut made by the cutting arrangement. For example, when cutting a ceramic tile, the pilot arrangement engages the surface of the tile, while the cutting arrangement cuts through the thickness of the tile, but the pilot arrangement does not cut beyond the tile, into the surface on which the tile is mounted.

The arrangements described allow a single drilling action to provide a guided hole-cutting action. A preliminary operation to drill a pilot hole is not required. A single drilling action therefore replaces two drilling operations, resulting in increased productivity. The risk of damage to the workpiece, particularly a ceramic tile, is expected to be reduced.

The workpiece could be a ceramic tile, wood, metal or other material.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A pilot arrangement rotatable about an axis to form a pilot recess in a workpiece, and to engage the pilot recess to prevent the pilot arrangement skidding across the workpiece, and the arrangement having a mounting portion, a cutting portion and an arrangement operable for refraction of the cutting portion relative to the mounting portion, wherein the pilot arrangement comprises a tip which engages the workpiece to form the pilot recess, and wherein the tip comprises a tip body having a tip extremity providing first contact with a workpiece, and having a cutting formation which cuts a workpiece as the extremity penetrates the workpiece, wherein the extremity is offset from the rotation axis, wherein the tip body has a tapering portion which tapers to the tip extremity, and wherein the tapering portion has the form of a cone centered at the rotation axis and including a cutout portion bounded at a surface which is not perpendicular to the rotation axis and which intersects the rotation axis and extends to the offset tip extremity.

2. Cutting apparatus in combination with the pilot arrangement of claim 1, comprising:
    a cutting arrangement rotatable about a rotation axis to engage a workpiece and form an annular cut therein, wherein the pilot arrangement is rotatable about the axis to engage the workpiece and form the pilot recess which is smaller in radius than the annular cut;
    the pilot arrangement serving to locate within the pilot recess to prevent the pilot arrangement skidding across the workpiece;

a drive arrangement for the cutting arrangement and for the pilot arrangement; and an arrangement operable for retraction of the pilot arrangement relative to the cutting arrangement, as the cutting arrangement is advanced.

3. Apparatus according to claim 2, wherein the pilot arrangement projects beyond the cutting arrangement, to engage a workpiece before the workpiece is engaged by the cutting arrangement.

4. Cutting apparatus according to claim 1, wherein the tip is carried by a member which engages the workpiece, as the pilot recess is formed, to limit the depth of the pilot recess.

5. Cutting apparatus according to claim 1, wherein the tip is carried by a cylindrical portion centered at the rotation axis.

6. A pilot arrangement according to claim 1, wherein the pilot arrangement is retracted by force applied to the pilot arrangement.

7. A pilot arrangement according to claim 6, wherein the force is generated by pushing the pilot arrangement against a workpiece.

8. A pilot arrangement according to claim 1, wherein the pilot arrangement is mounted by means of first and second components movable relative to each other, and a bias arrangement acting to bias the relative positions of the components.

9. A pilot arrangement according to claim 8, wherein the components are biased to relative positions at which the pilot arrangement is advanced.

10. A pilot arrangement according to claim 8, wherein the components form a telescopic arrangement.

11. A pilot arrangement according to claim 8, wherein the components are relatively movable along the axis.

12. A pilot arrangement according to claim 8, wherein one of the components is an elongate member, the other being a sleeve in which the elongate member is axially movable.

13. A pilot arrangement according to claim 12, wherein the elongate member is captive in the sleeve.

14. A pilot arrangement according to claim 1, wherein the pilot arrangement, in use, cuts the pilot recess.

15. A pilot arrangement according to claim 1, wherein an edge at the intersection of the bounding surface and the surface of the unmodified cone provides the or a cutting formation.

16. A pilot arrangement according to claim 1, wherein the bounding surface is a plane.

17. A pilot arrangement according to claim 4, wherein the cutting portion comprises a generally circular cutting edge.

* * * * *